United States Patent [19]
Hendricks et al.

[11] Patent Number: 5,893,088
[45] Date of Patent: Apr. 6, 1999

[54] SYSTEM AND METHOD FOR PERFORMING DATABASE QUERY USING A MARKER TABLE

[75] Inventors: Matthew C. Hendricks, Palo Alto; Kirk R. Martinez, San Jose; Naresh U. Mehta, Santa Clara, all of Calif.

[73] Assignee: Altera Corporation, San Jose, Calif.

[21] Appl. No.: 716,907

[22] Filed: Sep. 19, 1996

Related U.S. Application Data

[60] Provisional application No. 60/015,118, Apr. 10, 1996.
[51] Int. Cl.$^6$ .................................................. G06F 17/30
[52] U.S. Cl. .................................................. 707/3
[58] Field of Search .................. 707/1–5; 1/102

[56] References Cited

U.S. PATENT DOCUMENTS

| | | | |
|---|---|---|---|
| 4,811,199 | 3/1989 | Kuechler et al. | 364/200 |
| 5,204,958 | 4/1993 | Cheng et al. | 395/600 |
| 5,257,365 | 10/1993 | Powers et al. | 395/600 |
| 5,263,167 | 11/1993 | Conner, Jr. et al. | 395/700 |
| 5,265,244 | 11/1993 | Ghosh et al. | 395/600 |
| 5,265,246 | 11/1993 | Li et al. | 395/600 |
| 5,560,007 | 9/1996 | Thai | 707/3 |
| 5,577,241 | 11/1996 | Spencer | 707/5 |
| 5,619,713 | 4/1997 | Baum et al. | 707/102 |
| 5,664,172 | 9/1997 | Antoshenkov | 707/4 |
| 5,668,987 | 9/1997 | Schneider | 707/3 |

FOREIGN PATENT DOCUMENTS

WO 92/06440  4/1992  WIPO .............................. G06F 15/40

OTHER PUBLICATIONS

"Appendix B, B+ Tree Structure," *Turbo Database Toolbox Owner's Handbook*, Third Edition, Sep. 1985, pp. 131.

Freeland, "Exploring MDXs," *Data Based Advisor*, Feb. 1991, pp. 85–87.

Baker, "B–tree indexing: A look at indexing tradeoffs in dBASE, Clipper, and FoxPro," *Programmer's Journal*, vol. 8.6, Nov./Dec. 1990, pp. 42–46.

*Primary Examiner*—Maria N. Von Buhr
*Attorney, Agent, or Firm*—Townsend and Townsend and Crew LLP

[57] ABSTRACT

A system and method for performing complex queries in a database system. The method identifies a single type of entity in the database. A table or set of columns is formed that is used to track which entries meet the various subcriteria in a complex query through entry of binary marker bits. Logical operations may be performed on such marker bits to identify those entities meeting the specified search criteria. Through appropriate search planning, the bits may be "reused" during the query search. The method may be used in combination with, for example, index searches and other optimized searching techniques.

35 Claims, 4 Drawing Sheets

Microfiche Appendix Included
(1 Microfiche, 55 Pages)

Filter Expression Dialog Box

This dialog box is used to create a complex expression (made up of many sub-expressions) which will be used to filter out unnecessary material (wafers). To make an expression, the user must open up a filter expression dialog box as shown below:

SYSTEM AND METHOD FOR PERFORMING DATABASE QUERY USING A MARKER TABLE

CROSS-REFERENCE TO RELATED APPLICATIONS

This application claims the benefit of U.S. Provisional application No. 60/015,118, filed Apr. 10, 1996.

SOURCE CODE APPENDICES

A microfiche appendix containing a C++ language source code for an embodiment of the present invention is included in this application. The microfiche appendix includes one microfiche containing 55 frames.

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of database systems. More specifically, in one embodiment the invention provides a system and method for evaluating database queries.

Many applications of database systems have evolved over the past several years, and the size of the databases managed by these applications has become staggering in some instances. As the size of a managed database becomes large, it becomes increasingly difficult to evaluate the database to identify entries meeting particular query conditions. As an example, reservation systems often include millions of entries, and from these entries a single entry must be quickly located in order to serve a consumer. In other applications, such as manufacturing operations, millions of entries must be evaluated to identify which products, for example, meet certain manufacturing quality control criteria.

Historically, such queries were evaluated by "looking at" each entry in the database individually, and compiling the results as the entries were evaluated. A variety of techniques have been developed for evaluating such queries in a more efficient manner, however. For example, the use of indexes has become common. In an indexed database, a commonly queried field in the database is provided with a separate index field. When a query is applied against the database, it is then no longer necessary to evaluate each entry, enabling much faster access to a desired entry in a database. Such systems now commonly use a "b-tree" structure, as described in, for example, Knuth et al., The Art of Computer Programming, (1973). See Volume 3, Sorting and Searching, incorporated herein by reference for all purposes.

While meeting with some success, prior techniques have also met with certain limitations. For example, in indexed searching systems the size of the index can often become unwieldy both in terms of the size of the index and the time it takes to utilize the index. Moreover, when complex queries are imposed on the system, it often becomes difficult or impossible to use indexed systems because the parameters used in a complex query often have no index. Further, databases in which the data within the database are "denormalized" present particular difficulty, and procedures may need to be utilized to put the data in an acceptable form.

In the case of large databases, such complex queries can effectively not be performed, even on large computer systems. Moreover, the storage requirements of an index for such complex queries that span all fields would be unreasonably large.

From the above it is seen that an improved system and method for performing complex queries in a database system is needed.

SUMMARY OF THE INVENTION

An improved system and method for performing complex queries in a database system is provided by virtue of the present invention. This invention specifies a method for evaluating database queries made up of arbitrarily complex logical combinations of simpler subqueries. Often the database server software is not capable of evaluating the entire complex query in reasonable time, if at all. The system will, however, be capable of evaluating each of the simpler subqueries. The method also applies to situations in which the database server could, in principle, execute the complex query in reasonable time, but it is desired to build the complex query by "mixing and matching" standardized and speed optimized subqueries without having to create a large query command in a server's own native language. The system will find particular application in multi-processor systems, where various subqueries are executed among the various processors. Also, since the queries are broken up, it becomes possible for the user to manually optimize individual subqueries. The system is particularly useful in cases where an optimizer fails and the system approach in solving a complex query takes excessive amounts of time (if it can solve it at all). Also, the user need not type long queries using, e.g, a SQL language.

The method identifies a single type of entity in the database, e.g., part serial numbers in the case of a manufacturing line, or account numbers in the case of a banking application. A table or set of columns is formed that is used to track which entries meet the various subcriteria in a complex query through entry of binary marker bits. Logical operations may be performed on such marker bits to identify those entities meeting the specified search criteria. Through appropriate search planning, the bits may be "reused" during the query search. The method may be used in combination with, for example, index searches and other optimized searching techniques.

Accordingly, in one embodiment the invention includes the steps of identifying entries in a database, the identified entries meeting selected criteria of a database query; setting binary marker bits in a marker bit table for the entries identified as meeting selected criteria; performing Boolean operations on the binary marker bits, the Boolean operations selected to identify entries meeting additional selected criteria of the database query; and identifying entries meeting the database query using output of the Boolean operations on said marker bits.

A further understanding of the nature and advantages of the inventions herein may be realized by reference to the remaining portions of the specification and the attached drawings.

DESCRIPTION OF THE PREFERRED EMBODIMENTS

Figure 1:
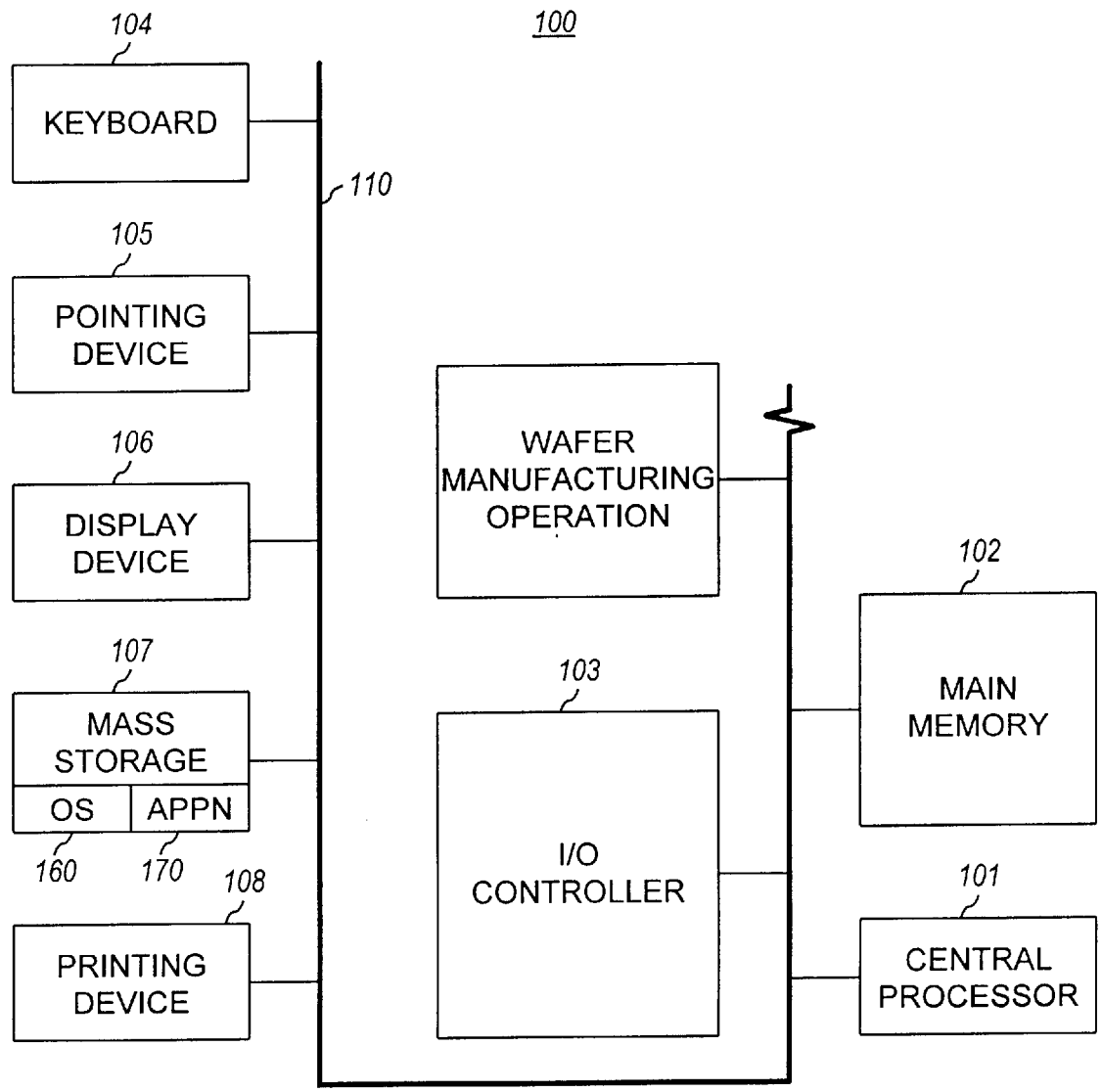
FIG. 1 is an overall illustration of a computer system utilized according to one embodiment of the invention herein.

The present invention may be embodied on a computer system such as the system 100 of FIG. 1, which includes a central processor 101, a main memory 102, an input/output controller 103, a keyboard 104, a pointing device 105 (e.g., mouse, track ball, pen device, or the like), a display device 106, and mass storage 107 (e.g., magnetic hard disk or optical disk). Additional input/output devices, such as a printing device 108, may be provided with the system 100 as desired. As shown, the various components of the system 100 communicate through a system bus 110 or similar architecture.

In a preferred embodiment, the system 100 is an IBM-compatible personal computer, available from a variety of vendors (including IBM of Armonk, N.Y.) or Sun workstations available from, Sun Microsystems, Inc. Operating system 160 is stored on mass storage 107 and loaded into main memory 102. Alternatively, the system 100 may be implemented in other platforms, including Macintosh, and the like. Application software 170 can include a variety of software applications, including word processing, spreadsheet, text editors, and the database system disclosed herein. According to a specific application herein, the main storge device(s) store data from an operation such as a semiconductor wafer manufacturing operation. Data stored relating to the various performance/testing parameters of die on manufactured wafers, or other manufacturing operations. Other applications will include, for example, banking and reservation systems.

According to the system herein, a database on the computer system is normally used to evaluate queries where all of the subqueries in an expression are "looking for" a single kind or type of entity. In the example of a manufacturing line used above, the subqueries may all be looking for part serial numbers for example. Of course, once the query is complete, any information about the resulting set of entries in the database may be displayed. In another representative example, all of the subqueries may be looking for bank account numbers meeting particular criteria in the case of a banking application.

The various subqueries are evaluated in an ordered fashion individually. A table or set of columns in the database is formed that is used to "mark" entities in the expression that meet the various subqueries. In a preferred embodiment the separate table or columns are used to store binary bits indicating which entries in the database have met individual search criteria within a complex query. Logical operations can then be performed on the bits of the separate table to determine which entries meet the complex query. In a preferred embodiment, the complex query is evaluated in a manner that allows bits of the table to be "reused" further simplifying the search system.

The invention is perhaps best illustrated through an arbitrary example. Suppose a database user wishes to evaluate the following logical expression:

Q=NOT (A XOR B) OR C AND (D OR E AND F)

where Q is the set of all database entries meeting the search criteria, A, B, C, D, E, and F are subexpressions (which are each individual queries themselves). For example, "A" may ask for all entries where one of the fields exceeds a certain value, while "B" may ask for all entries where another of the fields is set to equal a certain value, etc. It is assumed that the server software is not powerful enough to evaluate Q as a whole (or at least not in reasonable time or with a reasonable amount of memory), but is powerful enough to evaluate subexpressions A, B, C, D, E, F, normally by well accepted means such as through an index search. Each of the subexpressions can be a complex query in its own right, as expressed in the native server language (for example, some form of SQL). Each subexpression might make full use of the SQL syntax. The only assumption is that each subexpression is simple enough to be processed by the server in reasonable time. The form of each subquery can be independent of all the others; all that is required is that each subexpression select those elements in the database which have a particular property as specified by the query for that subexpression.

Although the selection criteria implied by each subexpression can be totally unrelated to all the others, it is assumed that all subexpressions are identifying one common type of entity. For example, if the database contains information about bank accounts, then each subexpression might be selecting those bank accounts that meet particular criteria. However, each subexpression might be asking a totally different kind of question, requiring a totally different form for the underlying query. For example, expression A might be a non-trivial question about average transaction frequency, and expression B might be a non-trivial question about loan delinquency. In any case, the evaluation of the complex expression Q will result in the selection or identification of all those entities that satisfy the logical expression. For instance, in the above example, any entity not selected by subexpression A and not selected by subexpression B would be selected by expression Q by virtue of the logical conjunctions.

The technique herein involves "marking" each entity that meets the criteria expressed by a particular subquery, so it is necessary to either add (for example) a column to an appropriate preexisting table which maps onto entities in a one to one manner, or to add a temporary table which maps markers to entities in the permanent table, or even another temporary table or elsewhere. Depending on the nature of the subqueries to be run, a temporary table may contain denormalized copies of fields needed by the subqueries.

The "marker table" has a marker column for binary bits. The same table contains pointers to entities. The bits in the marker column are bits that can be set or reset on an individual basis in order to indicate whether the entity has been selected by a particular subquery. Thirty-two bits is adequate for most cases using database applications available in present technology.

Although all of the queries could in principle be directly specified in native server language, the description of the invention method assumes that each of the subqueries is encapsulated in a remotely callable "stored procedure" on the database server. The stored procedure may take replaceable parameters to flexibly specify the query constraints. In the example of bank accounts, one stored procedure may allow selecting those accounts opened within a range of dates, with the minimum and maximum dates passed as parameters. Another may allow selecting those accounts with average daily balance between two specified parameters. The final parameter of all stored procedures will specify the bit number to be set within the marker column for those entities which satisfy the query.

The method preferable provides for a set of one or more stored procedures to carry out logical operations on the marker bits. These operations are independent of the properties of the entities and only deal with the marker bits themselves. For example, there could be one stored procedure for each of the logical operations of interest (i.e., AND, OR, XOR, NOT, etc.) or a single stored procedure taking the logical operation as a coded parameter. The logical operation procedure(s) will take additional parameters to indicate which marker bit(s) to perform the operation on (i.e., which are the operands of the operator), and which marker bit(s) to set if the operation results in a TRUE value (i.e., which bit will hold the result of the operation). The logical operation procedure will set the result bits only for those rows in the database which satisfy the expression implied by the operand bits and the operation. In addition, the procedure will clear the operand bits for every entity, regardless of whether the expression is satisfied. Table 1 illustrates this process.

In Table 1 it is assumed that three marker bits are used (Bits 2, 1, and 0). Bit 0 is used for a first query condition or entity (e.g., query A). Bit 1 is used for a second query condition or entity (e.g., query B). Bit 2 is used to indicate the result of a boolean operation on entity 1 and/or entity 2. Table 1 illustrates the initial bits that are set to "true" (or 1). The table then illustrates which bits are left at true (or 1) after performance of a particular boolean operation. In each case, the bits that are input are reset to "false" (or 0) after the boolean operation has been performed. For example, when bits 2 and 1 are initially true, the result of an AND operation is true. Therefore, bit 0 is set to true. At the same time, bits 2 and 1 are reset to 0. Therefore, only bit 0 (the result bit) is set to a true condition. Similar results are illustrated for other boolean operations and combinations of input bits. For example, in the first column of the Final Bits section of the table, the NOT operation says "For all entities not having bit 1 set, set bit 0, and clear bit 1 for all entities." The second column illustrates the AND operation saying in effect "For all entities having bit 1 set and bit 2 set, set bit 0, and clear bits 1 and 2 for all entities," etc.

TABLE 1

| Entity | "ON" or "True" Initial Bits | Operation Results (Final Bits Set True) | | | |
|---|---|---|---|---|---|
| | | NOT(1,0) | AND(2,1,0) | OR(2,1,0) | XOR(2,1,0) |
| Entity 1 | 2,1 | 2 | 0 | 0 | None |
| Entity 2 | None | 0 | None | None | None |
| Entity 3 | 1 | None | None | 0 | 0 |
| Entity 4 | 2 | 0 | None | 0 | 0 |

Figure 2:
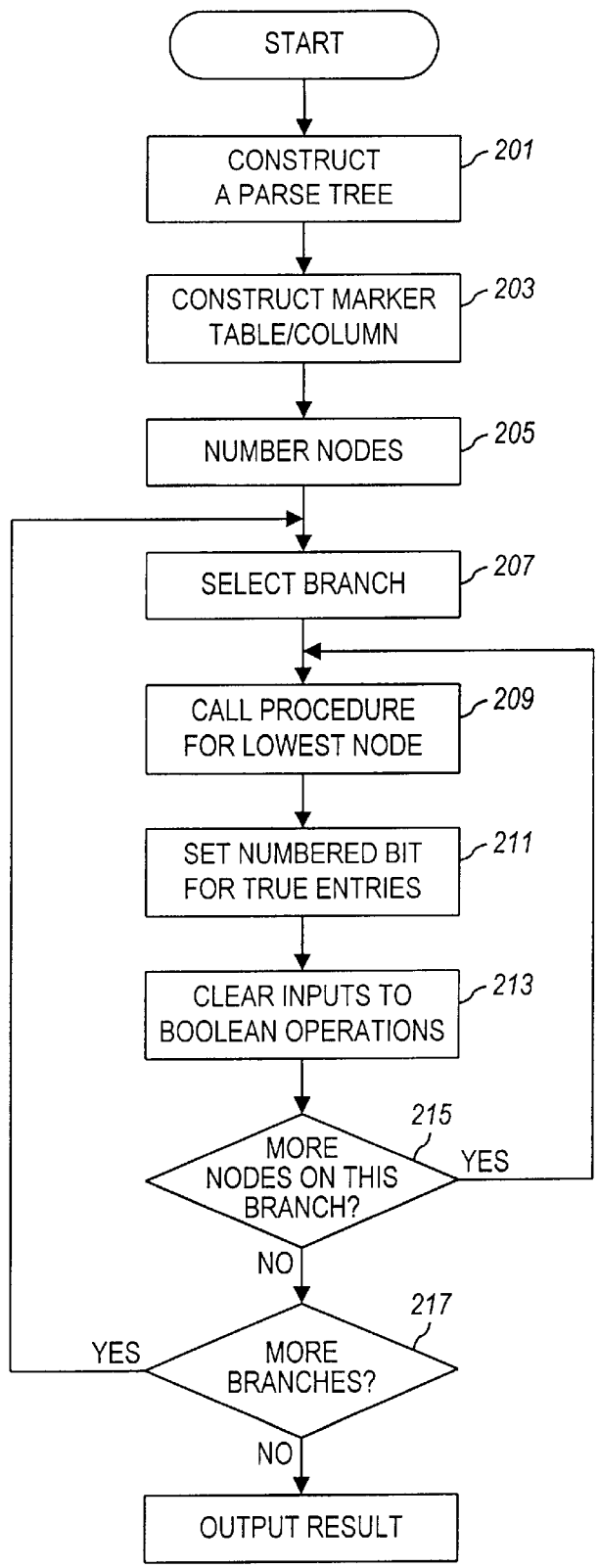
FIG. 2 is an overall flowchart illustrating operation of the invention.
Figure 3:
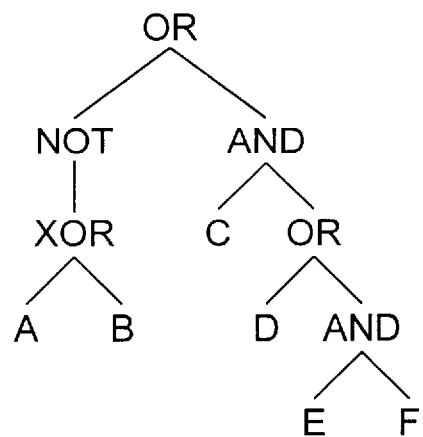
FIG. 3 illustrates a parse tree for a particular query.

FIG. 2 is a simplified flowchart illustrating the overall process of the invention herein. At step 201 a parse table is formed for the query. The parse tree is constructed using any of a number of standard software methods. The leaves of the tree will be the subexpressions, each corresponding to a stored procedure. The interior nodes of the tree will be the logical operations, each corresponding to a call to the appropriate logical operation procedure. The expression Q, above, will result in the parse tree illustrated in FIG. 3. At step 203 the system generates a mark table or column (if this has not already been done).

At step 205 each node of the tree is then numbered. The root of the tree is numbered with a specified number (in this case 0), while the left subtree is recursively numbered starting from one greater and the right subtree is recursively numbered from two greater. Table 2 illustrates one "C" language generic recursive traversal scheme. For the sample expression Q above, the process described herein results in the numbered nodes shown in FIG. 4.

TABLE 2

```
void Traverse ( PTreeNode node )
{
    if ( node->left != NULL )
        Traverse ( node->left );
    if ( node->right != NULL )
        Traverse ( node->right );
    // Do something with this node
}
```

Thereafter a "depth first" left to right traversal of the tree is performed, calling the stored procedure indicated at each node. For each operation, the node number for a particular node is used as the bit number for output of the procedure when calling the procedures for the subexpressions or the logical operations.

Specifically, at step 207 a branch is selected for evaluation. In the examples herein, left to right operations are performed, although the reverse could easily be incorporated. At step 209 the procedure for the lowest remaining node in this branch is called. In the first iteration, this will be node A in the specific example shown in FIG. 3. As the procedure continues, it is preferred that all leaf operations be performed before boolean operations are performed, although the system will also operate acceptably if one evaluates the lowest nodes in a branch, and works up a branch. The output of the operation at node A is stored at step 211 in, for example, the third marker bit; that is, for all entries meeting search criteria A, bit 3 is set to a 1 for the specific example in FIG. 3. At step 213 any inputs to a boolean operation performed at step 211 are cleared. At step 215 it is determined if there are more nodes on this branch. If so, step 209 is repeated. If not, it is determined if there are more branches to be evaluated at step 217. If so, step 207 is repeated. If not, the final output is provided from the system.

Figure 4:
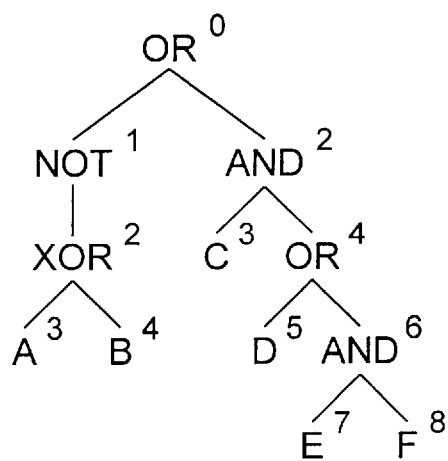
FIG. 4 illustrates the ordering of bits for various operations performed on the query in FIG. 2.

As illustrated in the example shown in FIG. 4, the marker bits will be reused during the process of evaluating the various operations herein. For example, bit 2 will be used to store the output of the AND of C and the result of the OR in expression Q as well as the output of the XOR operation. In this manner, a relatively small number of marker bits will be necessary. At the same time, complex query operations are simplified to simple logical operations on binary bits used as marker bits.

For example, the expression Q would be evaluated as follows. Following each step, the marker bits (using a 16 bit marker bit table) for a sample database are illustrated. It is assumed that 3 rows are present in the database. It is further assumed that the three entries meet/do not meet the search criteria A-F as shown in Table 3.

TABLE 3

| | Database Table | | | | | |
|---|---|---|---|---|---|---|
| | Subquery Expression | | | | | |
| Row # | A | B | C | D | E | F |
| 1 | Yes | Yes | No | No | Yes | Yes |
| 2 | No | Yes | No | Yes | No | Yes |
| 3 | Yes | Yes | Yes | No | No | No |

1. Clear all bits for all entities. (Note: Bit 0 is on the left for ease of illustration.) Result:
0000000000000000
0000000000000000
0000000000000000
2. Call stored procedure for A, setting bit 3 for all matching entities. Result:
0001000000000000
0000000000000000
0001000000000000
3. Call stored procedure for B, setting bit 4 for all matching entities. Result:
0001100000000000
0000100000000000
0001100000000000
4. Call XOR(3,4,2). This will set bit 2 for all entities in which either bit 3 or bit 4, but not both, is set, and will clear bits 3 and 4 for all entities. Result:
0000000000000000
0010000000000000
0000000000000000
5. Call NOT(2,1). This will set bit 1 for all entities in which bit 2 is not set, and will clear bit 2 for all entities. Result:
0100000000000000
0000000000000000
0100000000000000
6. Call stored procedure for C, setting bit 3 for all matching entities. Result:
0100000000000000
0000000000000000
0101000000000000
7. Call stored procedure for D, setting bit 5 for all matching entities. Result:
0100000000000000
0000010000000000
0101000000000000
8. Call stored procedure for E, setting bit 7 for all matching entities. Result:
0100000100000000
0000010000000000
0101000000000000
9. Call stored procedure for F, setting bit 8 for all matching entities. Result:
0100000110000000
0000010010000000
0101000000000000
10. Call AND(7,8,6). This will set bit 6 for all entities in which both bits 7 and 8 are set, and will clear bits 7 and 8 for all entities. Result:
0100001000000000
0000010000000000
0101000000000000
11. Call OR(5,6,4). This will set bit 4 for all entities in which either bits 5 or 6 or both are set, and will clear bits 5 and 6 for all entities. Result:
0100100000000000
0000100000000000
0101000000000000
12. Call AND(3,4,2). This will set bit 2 for all entities in which both bits 3 and 4 are set, and will clear bits 3 and 4 for all entities. Result:
0100000000000000
0000000000000000
0100000000000000
13. Call OR(1,2,0). This will set bit 0 for all entities in which either bits 1 or 2 or both are set, and will clear bits 1 and 2 for all entities. Result:
1000000000000000
0000000000000000
1000000000000000
14. Select all entities having bit 0 set, i.e. entities 1 and 3. This is the final result of the complex expression Q.

Note that the algorithm makes efficient use of bit numbers, for instance reusing numbers 2, 3, and 4 on the right side of the tree. This allows most practical complex expressions to be handled with a marker bitfield containing only 32 bits. In a preferred embodiment, unmarked elements or rows are deleted from the resulting temporary table.

Figure 5:
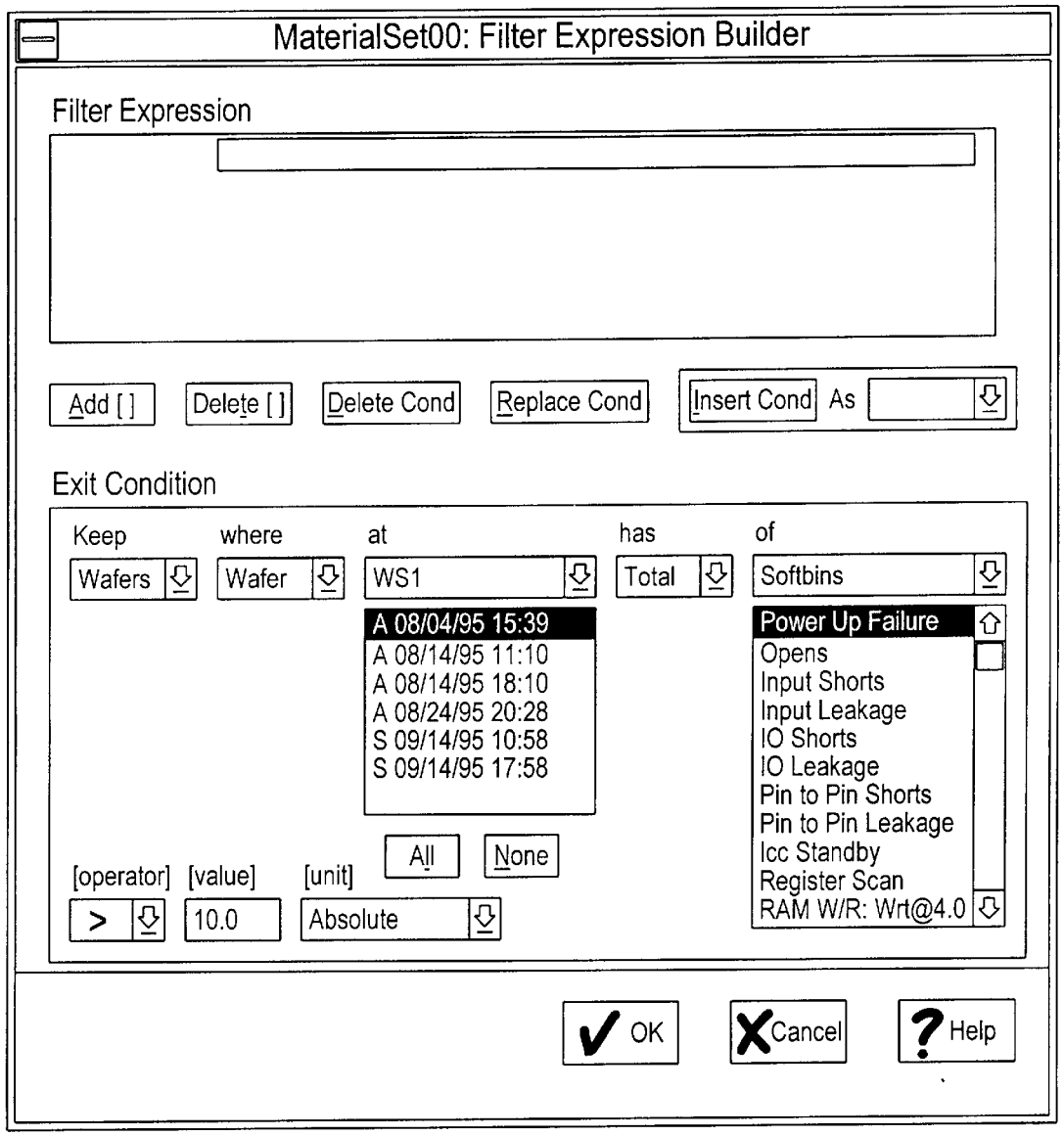
FIG. 5 illustrates a user interface for one particular embodiment of the invention.

Appendix 1 (© Copyright, Altera Corporation, All rights reserved) provides software illustrating one embodiment of the invention. The code in the appendix is, in one specific embodiment, used in the following programming environments:

Pentium 133 MHZ—PC
MS-Windows—OS
Borland C++—Compiler
MKS Toolkit—Lexer & Parser
SYBASE System 11—Backend Database FIG. 5 illustrates a typical user dialog box for use of the invention herein in a typical application. In this situation, the underlying data include a large database relating to the performance/testing of integrated circuits in a manufacturing operation. For each wafer (die unit) made in the manufacturing operation, its performance is measured and recorded. It is often desired to identify all of the wafers that meet specified criteria. For example, a user may wish to mark all die on a wafer that had a device with an open circuit condition as well as a device with a power up failure, and which were tested using a particular test program within specified dates.

The "filter expression builder" dialog allows the user to enter filtering conditions (sub-expressions). The upper half of the dialog box is occupied by the Filter Expression box which displays all the user entered filter conditions. All filtering conditions can be (but need not be) independent of the others. The purpose of each condition is to select all die information into a table.

All buttons below Filter Expression box, helps to manipulate filter conditions. For example the Add ( ) and Delete ( ) buttons bundle and debundle multiple conditions together. The Delete Cond, Replace Cond and Insert Cond buttons help the user to delete or replace an existing condition, and insert a new condition, respectively. The As pick list is normally filed with all Boolean connectors like OR, AND, XOR, etc., which connect two conditions together. The Boolean connectors are "parent" nodes as shown in FIG. 4.

The bottom half of the dialog box is occupied by the Edit Condition box. This box acts as a "bench" to build an individual condition. Once a condition is built the user can use the Insert Cond button (described above) to insert it into the Filter Expression box. To edit a condition, the user should select that condition box in the Filter Expression box to import it to the Edit Condition box. The user can now edit all components of that condition and the use Replace Cond button to replace with the newly edited condition.

In the Edit Condition box, the Keep pick list displays wafers or lots. When "wafers" is selected, the application will fill the Where pick list with a single value (Wafers). In that case, the current condition will be applied to all the wafers and only those wafers will be kept that meet the condition. When "lot" is selected, the Where pick list will be filled with three values, namely, All Wafers, Some Wafers and Entire lot. In this case, the current condition will be applied to either all wafers or lots based on what is picked in the Where pick list. If All Wafers is selected, the current condition will be applied to all wafers, i.e., the lot is kept if all of its wafer satisfies the condition. If Some Wafers is selected, the current condition will be applied to all wafers but the lot is kept even if only one wafer of that lot satisfies the condition. Finally, if Entire lot is selected, the current condition will be applied to an entire lot, and the lot is kept if it satisfies the condition. With proper combination of the two pick lists, the user can perform almost any kind of filtering.

The At pick list allows the user to pick a teststep and program revisions of interest. Once a test step is selected, the application automatically fills all available program revisions in a pick list below it. By default, all the revisions are selected, but the user can select/unselect a revision by clicking on it. The Has/Have pick list provides many statistical operators like total, minimum, maximum, average and standard deviation. The Of pick list allows the user to perform filtering based on Bin, Bin Categories, Parameters, number of wafers in a lot, Total tested/Passed/failed dice in lot/wafer etc. The (Operator) pick list contains all mathematical equality operators like=, < >, >, <, >= and <=. The user can enter a numerical value into the (Value) edit box. The (Unit) pick list contains different kinds of units and symbols which give a meaning to the value specified in the (Value) edit box. For example, it may contain mA, Volts, percentage, normalized percentage or absolute number symbols.

The contents of the Edit Condition box shown in FIG. 5 above illustrate that the user would like to keep wafers that are tested at teststep WS1 with a Aug. 4, 1995 15:39 testflow revision with a total of more than 10 die power-up failures (absolute) on each wafer. Table 4 summarizes the possible values in each pick list:

TABLE 4

| Keep | Where | At | Has/Have | Of | (Operator) | (Value) | (Unit) |
|---|---|---|---|---|---|---|---|
| Wafers | All Wafers | WS1 | Total | Lot Number | = | Filled in | Absolute Number |
| Lot | Some Wafers | WS2 | Min | Wafers in Lot | <> | by User | Percentage |
| | Entire Lot | WS3 | Max | Tested | > | | Normalized |
| | | etc., and | Average | Passed | < | | Percentage |
| | | testflow | Std Dev | Failed | >= | | mA |
| | | revisions . . . | | HB1-Perfect | <= | | Volts |
| | | | | HB2-Repaired | | | . . . other units |
| | | | | . . . (all hardbins) | | | appropriate to |
| | | | | SB1-Opens | | | chosen |
| | | | | SB2-Input | | | parameters |
| | | | | Shorts | | | |
| | | | | . . . (all softbins) | | | |
| | | | | Icc at 4.5 Volts | | | |
| | | | | . . . (all params) | | | |
| | | | | (all info bins) | | | |

The above description is illustrative and not restrictive. Many variations of the invention will become apparent to those of skill in the art upon review of this disclosure. Merely by way of example, the invention has been applied to manufacturing operations as a specific example, but the invention is not so limited. The scope of the invention should, therefore, be determined not with reference to the above description, but instead should be determined with reference to the appended claims along with their full scope of equivalents.

What is claimed is:

1. A method of performing a database query comprising:
   determining a set of selected criteria of said database query;
   identifying entries in said database that meet said selected criteria;
   setting binary marker flags in a marker flag table for said entries identified as meeting said selected criteria;
   performing Boolean operations on said binary marker flags, said Boolean operations selected to identify entries meeting additional selected criteria of said database query;
   storing results of said Boolean operations in said marker flag table; and
   identifying entries meeting said database query using results of said Boolean operations stored in said marker flag table.

2. The method as recited in claim 1 wherein said marker flags are marker bits.

3. The method as recited in claim 1 wherein results of said Boolean operations result in setting of additional marker flags in said marker flag table to identify entries in said marker flag table meeting said additional criteria of said database query.

4. The method as recited in claim 1 further comprising forming a parse tree for said database query.

5. The method as recited in claim 4 further comprising selecting selected ones of said marker flags to correspond to results of queries in said parse tree.

6. The method as recited in claim 5 wherein at least one of said marker flags is used to correspond to more than one result in said parse tree.

7. The method as recited in claim 5 wherein said selecting selected ones of said marker flags comprises:
   numbering a root of said parse tree with a first value; and
   numbering nodes of one branch of said tree from a second value, said second value incremented from said first value, and a second branch of said tree from a third value, said third value incremented from said second value.

8. The method as recited in claim 7 wherein said root is numbered 0, said first value is 1 and said second value is 2.

9. The method as recited in claim 7 wherein nodes of said first branch and said second branch have the same value.

10. The method as recited in claim 1 wherein said identifying entries in said database comprises calling a stored database query procedure.

11. The method as recited in claim 10 wherein said stored database query procedure is an index table search.

12. The method as recited in claim 3 further comprising clearing flag input to said Boolean operation.

13. The method as recited in claim 12 further comprising using said cleared flags as marker flags for identifying entries in said database meeting additional selected criteria.

14. The method as recited in claim 6 wherein nodes of said parse tree are logical operations, and leaves of said tree are subexpressions.

15. The method as recited in claim 14 wherein said subexpressions correspond to stored procedures.

16. The method as recited in claim 13 further comprising:
    selecting a first branch of a parse tree of said query;
    calling procedures for nodes in said first branch;
    setting said binary marker bits for true entries based on said stored procedures;
    performing said Boolean operations and clearing inputs to said Boolean operations;
    selecting a second branch of said parse tree; and
    repeating at least said selecting said first branch, said calling procedures, and said setting said binary marker bits on said second branch of said parse tree.

17. The method as recited in claim 1 wherein said database maintains performance information on products in a manufacturing line.

18. The method as recited in claim 1 wherein said database maintains performance information on integrated circuits in a manufacturing line.

19. Software on a computer readable storage media comprising:
    code for determining a set of selected criteria of said database query;
    code for identifying entries in said database that meet said selected criteria;
    code for setting binary markers in a marker table for said entries identified as meeting said selected criteria;
    code for performing Boolean operations on said binary markers, said Boolean operations selected to identify entries meeting additional selected criteria of said database query;
    code for storing results of said Boolean operations in said marker table; and
    code for identifying entries meeting said database query using results of said Boolean operations stored in said marker table; and
    a computer-readable storage medium for storing said codes.

20. The software as recited in claim 19 wherein results of said Boolean operations result in setting of additional markers in said marker table to identify entries in said marker table meeting said additional criteria of said database query.

21. The software as recited in claim 19 further comprising code for forming a parse tree for said database query.

22. The software as recited in claim 21 further comprising code for selecting selected ones of said markers to correspond to results of queries in said parse tree.

23. The software as recited in claim 22 wherein at least one of said markers is used to correspond to more than one result in said parse tree.

24. The software as recited in claim 22 wherein said code for selecting selected ones of said markers comprises:
    code for numbering a root of said parse tree with a first value; and
    code for numbering nodes of one branch of said tree from a second value, said second value incremented from said first value, and a second branch of said tree from a third value, said third value incremented from said second value.

25. The software as recited in claim 24 wherein said root is numbered 0, said first value is 1 and said second value is 2.

26. The software as recited in claim 24 wherein nodes of said first branch and said second branch have the same value.

27. The software as recited in claim 19 wherein said code for identifying entries in said database comprises code for calling a stored database query procedure.

28. The software as recited in claim 27 wherein said stored database query procedure is an index table search.

29. The software as recited in claim 20 further comprising code for clearing bits input to said Boolean operation.

30. The software as recited in claim 29 further comprising code for using said cleared bits as markers for identifying entries in said database meeting additional selected criteria.

31. The software as recited in claim 23 wherein nodes of said parse tree are logical operations, and leaves of said tree are subexpressions.

32. The software as recited in claim 31 wherein said subexpressions correspond to stored procedures.

33. The software as recited in claim 30 further comprising:
    code for selecting a first branch of a parse tree of said query;
    code for calling procedures for nodes in said first branch;
    code for setting said binary markers for true entries based on said stored procedures;
    code for performing said Boolean operations and clearing inputs to said Boolean operations;
    code for selecting a second branch of said parse tree; and
    code for repeating at least said code for selecting said first branch, code for calling procedures, and code for setting said binary markers on said second branch of said parse tree.

34. The software as recited in claim 19 wherein said database maintains performance information on products in a manufacturing line.

35. The software as recited in claim 19 wherein said database maintains performance information on integrated circuits in a manufacturing line.

* * * * *